United States Patent
Chen et al.

(10) Patent No.: US 9,582,270 B2
(45) Date of Patent: Feb. 28, 2017

(54) EFFECTIVE FEATURE LOCATION IN LARGE LEGACY SYSTEMS

(71) Applicant: International Business Machines Corporation, Armonk, NY (US)

(72) Inventors: Hao AC Chen, Beijing (CN); Ya Bin Dang, Beijing (CN); Shao Chun Li, Beijing (CN); Guang Tai LT Liang, Beijing (CN); Li Jun Mei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/700,772

(22) Filed: Apr. 30, 2015

(65) Prior Publication Data
US 2016/0321069 A1 Nov. 3, 2016

(51) Int. Cl.
*G06F 9/44* (2006.01)

(52) U.S. Cl.
CPC .................. *G06F 8/75* (2013.01); *G06F 8/10* (2013.01); *G06F 8/20* (2013.01)

(58) Field of Classification Search
None
See application file for complete search history.

(56) References Cited

U.S. PATENT DOCUMENTS

| | | |
|---|---|---|
| 8,209,665 B2 | 6/2012 | Rama et al. |
| 8,250,536 B2 | 8/2012 | Woods |
| 8,352,387 B2 | 1/2013 | Moore |
| 8,566,789 B2 | 10/2013 | Siddaramappa et al. |

(Continued)

FOREIGN PATENT DOCUMENTS

WO   WO 2012/127308 A1   9/2012

OTHER PUBLICATIONS

Ratanotayanon et al., "Using Transitive Changesets to Support Feature Location," In Proceedings of 25th IEEE/ACM International Conference on Automated Software Engineering, ASE'10, Sep. 20-24, 2010, Antwerp, Belgium, pp. 341-344.

(Continued)

*Primary Examiner* — Chuck Kendall
(74) *Attorney, Agent, or Firm* — Scully, Scott, Murphy & Presser, P.C.; Kevin Jordan, Esq.

(57) ABSTRACT

A fine-grained behavior model matching based method and system for effective feature location in large legacy systems. A feature behavior analyzer extracts internal behaviors of a feature under requesting based on NLP techniques or writing rules of the feature specification and generates a feature behavior model. A method uses multiple information sources associated with each method under analyzing to generate an expressive behavior signature for each method. The method integrates control flow information of each method and the signature information of its callees, and generates a CFG-based behavior model. A feature location identifier identifies and ranks the feature-related code locations based on a similarity between the feature behavior and the code behavior models. In one aspect, "use cases", "source code repository" and "issue tracking system" are historical information of existing applications that are used to help understand each code unit of legacy systems applications, and recommend code units related with the given feature description.

20 Claims, 12 Drawing Sheets

(56) References Cited

U.S. PATENT DOCUMENTS

2011/0271253 A1 11/2011 Bnayahu et al.
2013/0086556 A1* 4/2013 Grechanik .......... G06F 11/3684
 717/126

OTHER PUBLICATIONS

Agrawal et al. "Mining System Tests to Aid Software Maintenance," Computer, vol. 31, Issue 7, Jul. 1998, pp. 64-73.
Asadi et al., "A Heuristic-based Approach to Identify Concepts in Execution Traces," 2010 14th European Conference on Software Maintenance and Reengineering (CSMR), Madrid, Mar. 15-18, 2010, pp. 31-40.
Binkley et al., "Information Retrieval Applications in Software Development," Encyclopedia of Software Engineering, DOI: 10.1081/E-ESE-120044371, 2011 by Taylor & Francis.
Binkley et al., "Information Retrieval Applications in Software Maintenance and Evolution," Encyclopedia of Software Engineering, DOI: 10.1081/E-ESE-1200443704, 2011 by Taylor & Francis.
Abebe et al., "Natural Language Parsing of Program Element Names for Concept Extraction," 18th International Conference on Program Comprehension (ICPC), 2010 IEEE, Jun. 30-Jul. 2, 2010, pp. 156-159.
Biggerstaff et al., "The Concept Assignment Problem in Program Understanding," 15th International Conference on Software Engineering, May 17-21, 1993, pp. 482-498.
Čubranić et al., "Hipikat: Recommending Pertinent Software Development Artifacts," ICSE'03, 25th International Conference on Software Engineering, Portland, OR, USA, May 3-10, 2003, IEEE Computer Society, pp. 1-11.
Coppit et al, "Spotlight: A Protype Tool for Software Plans," ICSE 2007, 29th International Conference on Software Engineering, May 20-28, 2007, pp. 754-757.
Chen et al., "RIPPLES: Tool for Change in Legacy Software," 2001, Proceedings IEEE International Conference on Software Maintenance, Nov. 7, 2001-Nov. 9, 2001, pp. 230-239.
Chen et al., "CVSSearch: Searching through Source Code using CVS Comments," 2001, Proceedings, IEEE International Conference on Software Maintenance, Nov. 7, 2001-Nov. 9, 2001, pp. 364-373.
Antoniol et al., "Feature Identification: A Novel Approach and a Case Study," 2005, ICSM'05, Proceedings of the 21st IEEE International Conference on Software Maintenance, Sep. 26-29, 2005, pp. 357-366.
Buchta et al., "Teaching Evolution of Open-Source Projects in Software Engineering Courses," 2006, ICSM'06, 22nd IEEE International Conference on Software Maintenance, Sep. 24-27, 2006, pp. 136-144.
Savage et al., "TopicXP: Exploring Topics in Source Code using Latent Dirichlet Allocation," (ICSM), 2010 IEEE International Conference on Software Maintenance, Sep. 12-18, 2010, pp. 1-6.
Chen et al., "Case Study of Feature Location Using Dependence Graph," 2000, Proceedings, IWPC 2000, 8th International Workshop on Program Comprehension, Jun. 10, 2000-Jun. 11, 2000, pp. 241-247.
Antoniol et al., "Feature Identification: An Epidemiological Metaphor," IEEE Transactions on Software Engineering, vol. 32, No. 9, Sep. 2006, pp. 1-15.
Bohnet et al., "Facilitating Exploration of Unfamiliar Source Code by Providing 2½D Visualizations of Dynamic Cell Graphs," 2007, VISSOFT 2007, 4th IEEE International Workshop on Visualizing Software for Understanding and ANalysis, Jun. 24-25, 2007, pp. 63-66.
Buckner et al., "JRipples: A Tool for Program Comprehension during Incremental Change," 2005, IWPC 2005, 13th International Workshop on Program Comprehension, May 15-16, 2005, pp. 149-152.
Blei et al, "Latent Dirichlet Allocation," Journal of Machine Learning Research 3 (2003) submitted Feb. 2002, published Jan. 2003, pp. 993-1022.
Carver et al., "Sorting out Concerns," OOPSLA'00, First Workshop on multi-dimensional separation of concerns in object-oriented systems, Nov. 1, 1999, pp. 1-6.
Cleary et al., "Assisting Concept Location in Software Comprehension," PPIG'07—19th Annual Workshop, Psychology of Programming Interest Group, Full paper, Jul. 2, 2007-Jul. 3, 2007, Joensuu, Finland.
Brin et al., "The Anatomy of a Large-Scale Hypertextual Web Search Engine," WWW7 Proceedings of the seventh International Conference on World Wide Web 7, vol. 30, Issue 1-7, Apr. 1, 1998, pp. 107-117.
Comon, "Independent component analysis, A new concept?," Signal Processing 36 (1994) Elsevier Science, received Aug. 24, 1992, pp. 287-314.
Bohnet et al., "Analyzing Feature Implementation by Visual Exploration of Architecturaly-Embedded Call-Graphs," WODA'06, May 23, 2006, Shanghai, China, pp. 41-47.
Eisenbarth et al., "Locating Features in Source Code," IEEE Transactions on Software Engineering, vol. 29, No. 3, Mar. 2003, pp. 210-224.
Eyal-Salman et al., "Feature-to-Code Traceability in a Collection of Software Variants: Combining Formal Concept Analysis and Information Retrieval," (IRI) 2013, IEEE 14th International Conference on Information Reuse and Integration, Aug. 14-16, 2013, pp. 209-216.
Mehta et al., "Evolving Legacy System Features into Fine-Grained Components," ICSE'02, Proceedings of the 24th International Conference on Software Engineering, May 25-28, 2001, Buenos-Aires, Argentina, pp. 417-427.

* cited by examiner

```
public double sellHolding (String userID, String symbol, int indx)    ⟵─10
    throws TradeException, RemoteException {
        ......
        HoldingObject holding = findHolding(userID, symbol, indx, myConn);
        ......
        if ( holding != null ) {
            double quantity = holding.quantity;
            boolean success = false;                    ┌─12
            ┌──────────────────────────────────┐
            │   success = removeHolding(holding, myConn);  │
            └──────────────────────────────────┘
            if ( success ) {
                balance += price * quantity;
                updateAccount(userID, balance, myConn);
            }
            ......
        }
        return balance;
}
```

FIG. 1A

```
                                                                10'
                                                                 ↯
    public double sellHolding (String userID, String symbol, int indx, int quantity)
        throws TradeException, RemoteException {
            ......
            HoldingObject holding = findHolding(userID, symbol, indx, myConn);
            ......
            if ( holding != null ) { boolean success = false;
                ┌──────────────────────────────────────────┐
                │   success = removeHolding(holding, myConn, quantity);  │
                └──────────────────────────────────────────┘
         12'─      if ( success ) {
                    balance += price * quantity;
                    updateAccount(userID, balance, myConn);
                }
                ......
            }
            return balance;
        }
```

FIG. 1B

EFFECTIVE FEATURE LOCATION IN LARGE LEGACY SYSTEMS

FIELD

The present disclosure generally relates to data management systems and methods, and particularly, a technique for determining effective features in large legacy systems with both high precision and recall.

BACKGROUND

A feature is a functional requirement of a program that produces an observable behavior which users can trigger.

Feature location is the activity of identifying the source code elements (i.e., methods) that implement a feature, e.g., by implementing techniques (systems and methods) for identifying/locating an initial location in a source code that corresponds to a specific functionality. Such techniques are referred to herein as Feature Location Techniques (FLTs).

While source code itself may be broken down for analysis according to different granularity levels: e.g., classes/files, methods or functions, and statements (i.e., basic blocks, lines of code, variables, etc.), the located code entry is also called a feature location. Existing (FLTs) solutions for determining an initial location in a source code include dynamic, static, textual, historical, and hybrid techniques.

Identifying/Locating an initial location in the source code that corresponds to a specific functionality/feature is challenging. Existing approaches however currently have problems including that such techniques do not consider the internal behavior information of each method which leads to a precision loss or recall loss.

For example, FIG. 1A shows a first example excerpt of a C++ program fragment that includes a method 10 named "sellHolding( )" obtained as part of a legacy system source code. This sellHolding( ) function 10 is defined as importing three variables (userID string, symbol, and index integer) and includes an assignment of a value to a variable "success" based on a call to a further object "removeHolding" at method step 12. FIG. 1B shows a second example instance of the same source code method name sellHolding( ) 10', however found in a more recent version of the same example legacy software. This sellHolding( ) method 10' function imports an additional variable (userID string, symbol, index integer and quantity integer) and also includes an assignment of a value to a variable "success" at method step 12' however, based on a call to a completely different object "reduceHolding". Thus, identifying this feature may lead to precision loss or recall loss given that a call to this method may provide an inconsistency given the different internal behaviors of this same method.

As large systems are componentized by hundreds of applications, middlewares, etc., the system could contain thousands of components, interfaces, millions of lines of code which does far exceed the upper limit of what can be handled by humans. Not only because of an architecture that is complex, but also because the system may rapidly change e.g., banking system.

Thus, it is a challenge how to effectively identify feature locations in large systems, such as legacy computer systems, with high precision and recall.

BRIEF SUMMARY

A system and method that leverages static code analysis and other techniques to identify code internal behaviors to support better feature location in large legacy system source code.

The computer-implemented system and methods implement a behavior-model feature location approach that effectively combine multiple technologies including use of static code analysis, mining revision history information and issue database, and natural language processing (NLP) techniques.

A system and method implementing fine-grained behavior model matching for effective feature location of software of large legacy systems.

According to an aspect of the present disclosure, there is provided a computer-implemented method for effective feature location in software code. The method comprises: receiving a specification of a software feature implementation to be located in software code, generating a feature behavior model specifying one or more of: an action and/or entity master behavior and an action and/or entity slave behaviors; accessing methods from a source code repository; and generating an expressive behavior signature for an accessed method; identifying one or more feature-related code scope methods exhibiting the feature implementation using the expressive behavior signature for the method and the generated feature behavior model associated with the feature description; generating a code behavior model for each one or more feature-related code scope method; determining a similarity between the feature behavior model and the code behavior models; and identifying and ranking a feature location feature-related code locations based on the similarity determining, wherein a hardware processor device performs one or more the receiving, the feature behavior model generating, the accessing, the analyzing, the expressive behavior signature generating, the feature-related code scope identifying, the code behavior model generating determining, and the feature-related code locations identifying and ranking.

According to another aspect of the present disclosure, a system for effective feature location in software code n apparatus is provided. The system comprises: a memory storage device storing a program of instructions; a hardware processor device receiving the program of instructions to configure the processor device to: receive a specification of a software feature implementation to be located in software code, generate a feature behavior model specifying one or more of: an action and/or entity master behavior and an action and/or entity slave behaviors; access methods from a source code repository; and generate an expressive behavior signature for an accessed method; identify one or more feature-related code scope methods exhibiting the feature implementation using the expressive behavior signature for the method and the generated feature behavior model associated with the feature description; generate a code behavior model for each one or more feature-related code scope method; determine a similarity between the feature behavior model and the code behavior models; and identify and rank a feature location feature-related code locations based on the similarity determining.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

Other aspects, features and advantages of the present invention will become more fully apparent from the following detailed description, the appended claims, and the accompanying drawings in which similar elements are given similar reference numerals.

FIG. 1A depicts an example software code segment indicating a method exhibiting a first internal behavior, and FIG. 1B depicts an example software code segment of the same method exhibiting a second first internal behavior;

DETAILED DESCRIPTION

The present disclosure relates to feature location in software code of large legacy systems. Typically such "legacy" systems include computer systems applications which continue to be used because of the cost of replacing or redesigning it and often despite its poor competitiveness and compatibility with modern equivalents. The implication is that the legacy system code is large, monolithic and difficult to modify. However, it is understood that the systems and methods described herein can be applied for all kinds of existing software systems (e.g., that could include many applications, middleware components, a database system, etc.).

Figure 2:
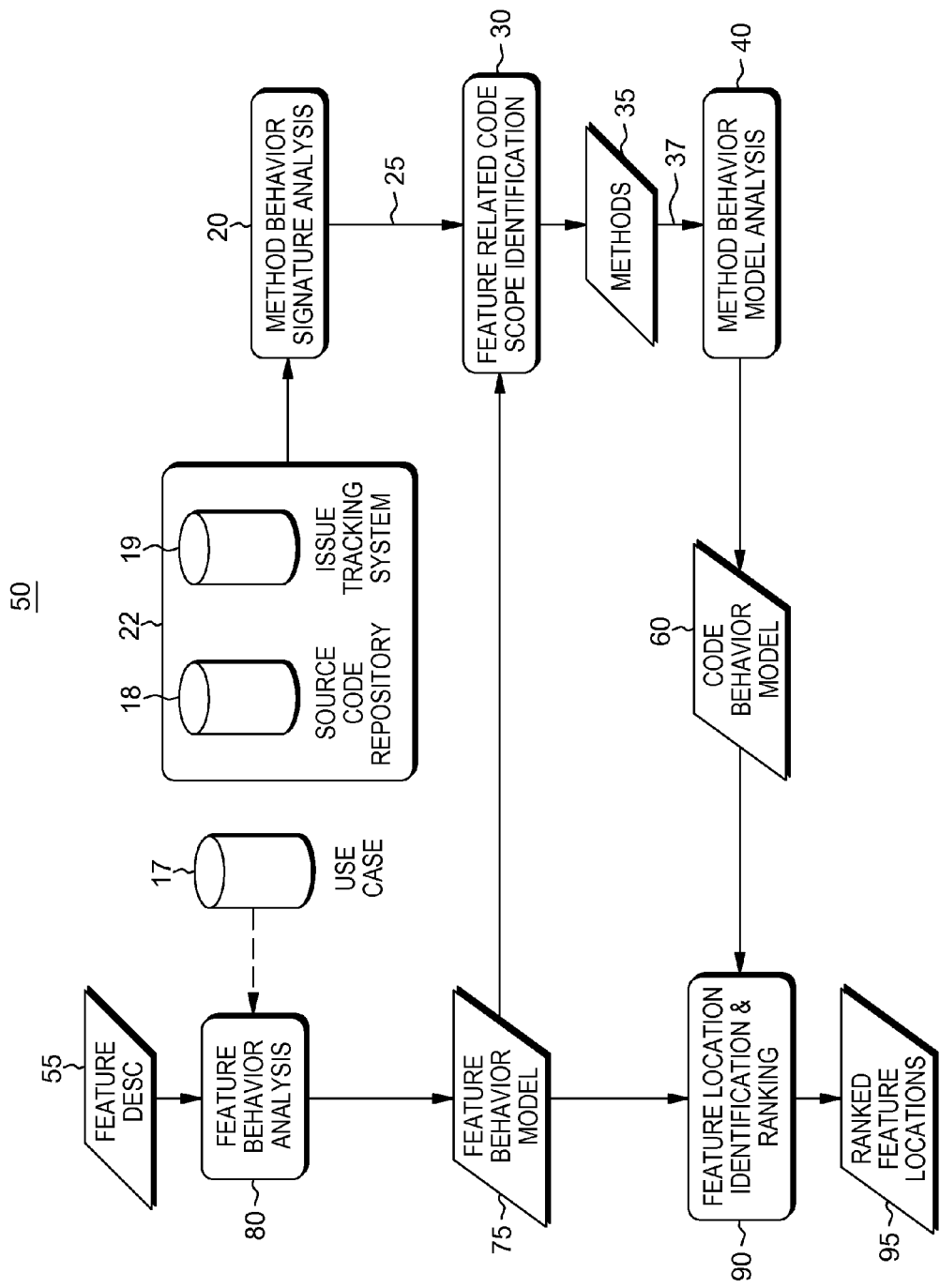
FIG. 2 depicts a block diagram of a system providing the feature location techniques according to an embodiment of the present disclosure.

FIG. 2 illustrates one embodiment of a fine-grained behavior model matching based method and system 50 for effective feature location in large legacy computer systems. The system 50 includes a feature behavior model analyzer 80, for extracting internal behaviors of a feature under querying based on NLP techniques or rules written that specify the feature. For example, using a description 55 of the feature, and optionally, a use case scenario stored in a repository 17, a feature behavior model 75 describing the code feature to be located is generated. In an example implementation, a given feature description may include two parts: a high level description, and a more detailed description. The method applies NLP techniques (e.g., Apache OpenNLP) to extract verb-noun pairs from the high level description as "master" behaviors, and applies NLP techniques (e.g., Apache OpenNLP) to extract verb-noun pairs from the low level descriptions and also the use case (if available) as "slave" behaviors. System 50 further implements a method behavior signature analyzer 20, which obtains information from multiple information sources 22 associated with each method being analyzed to generate an "expressive" behavior signature 25 for each method in the source code. Multiple information sources include but are not limited to: source code information, code comments, historical development and revision information (e.g., providing related artifacts information such as commit log messages, issue descriptions, etc.). Thus, for each method, related commit logs stored in source code repositories, related issues stored in issue-tracking systems, and code comments associated with the method are used to generate its behavior signature and behavior model.

In one aspect, 'expressive' means describing the features of each corresponding method more expressively (e.g., not only show internal behaviors, but also control flows of internal behaviors). Use of information of multiple sources helps narrow down code scope, avoid path explosion, and facilitates obtaining a control flow of source code by associating and sequencing historical information.

For example, as shown in FIG. 2, the behavior signature analyzer 20 performs methods to access a source code repository 18, to which the behavior signature analyzer 20 performs analysis upon the software legacy code to generate an expressive behavior signature 25. Further information sources used in the behavior signature analysis may include information of/from an issue tracking system 19. In one embodiment, a source code repository is a file archive and web hosting facility where large amounts of source code for software, but also for web pages are kept, either publicly or privately. They are often used by open-source projects and other multi-developer projects to handle various versions. They help developers submit patches of code in an organized fashion. Often these web sites support version control, bug tracking, release management, mailing lists and other related artifacts. System 50 further implements a feature related code scope identification module 30 that receives the generated expressive behavior signature 25 and the generated feature behavior model 75 associated with the feature description and implements processing to identify the source code methods 35 exhibiting the feature. The feature related code scope identification module 30 also generates control flow information for the subject methods 35 being analyzed. The methods 37 that are identified by processing module 30 as including the feature related code are then input to a method behavior model analysis module 40 for determining the method's behavior. In one embodiment, the method behavior model analyzer 40 integrates control flow graph (CFG) information generated for each method, and the signature information of its callees to generate an extended CFG-based code behavior model 60 for each method 35. That is, the behavior signatures of callees are used to construct a behavior model of a caller. The generated feature behavior model 75 and the generated code behavior model 60 are both input to a feature location identifier and ranking module 70, which identifies and ranks the initial code locations 95 related to the feature under querying based on the similarity between the feature behavior model and the method behavior models.

Figure 3:
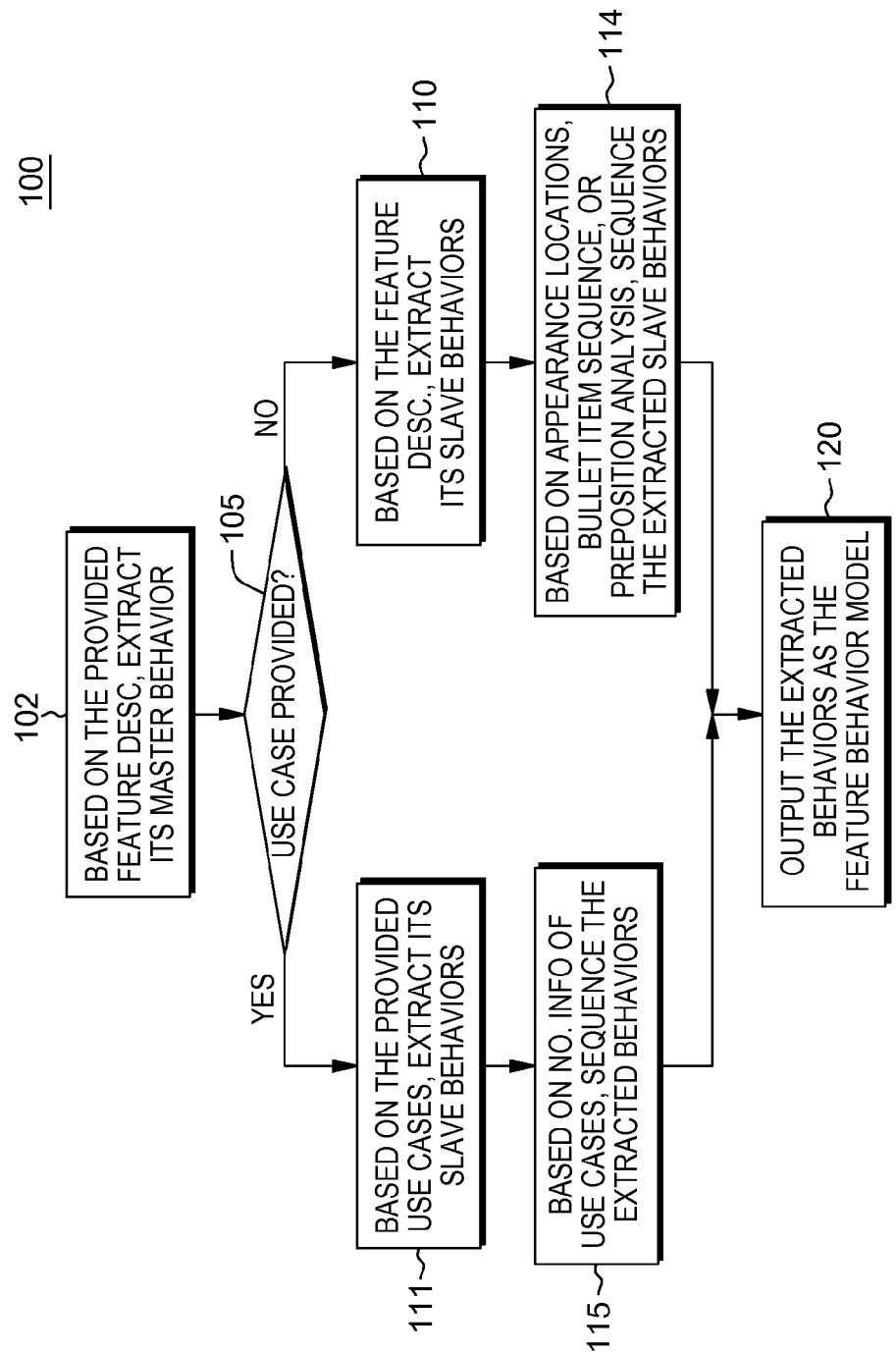
FIG. 3 shows a detailed flow diagram of a method implemented at the feature behavior analysis module of FIG. 2 according to one embodiment.

FIG. 3 shows a detailed flow diagram of a method 100 implemented at the feature behavior analysis module 80 of FIG. 2. As mentioned, feature behavior analysis module 80 includes functionality for extracting internal behaviors of a feature under query and generating the feature behavior model 75. Thus, as shown at first step 102, the feature behavior analysis method first receives or accesses the provided feature description 55 to extract its master behavior. Thus, required inputs to the feature behavior analysis module 80 include the feature description and the optional use case. Continuing, at 105, a determination is made as to whether a use case scenario had been provided for the feature behavior analysis. If a use case had not been provided, the method proceeds to 110 wherein based on the feature description, the methods extracts its slave behaviors; Otherwise, if a use case scenario had been provided, then at 111, extracting slave behaviors is based on the provided use case(s). Continuing for the case in which no use case scenario has been provided, the method proceeds from 110 to 114 in which the method identifies a sequence of the extracted slave behaviors. That is, based on appearance locations, bullet item sequence, or a preposition analysis identified in the source code, the extracted slave behaviors may be sequenced. Otherwise, if a use case scenario is provided, processing step 115 from step 111 includes sequencing the extracted slave behaviors based on the information provided in use cases. Whether obtained via use case scenarios at 115, or based on appearance locations in the code at 114, the process proceeds to 120 for outputting the extracted feature behaviors as the feature behavior model 75 (FIG. 2).

An example illustration of feature behavior analysis module functionality 80 for building a feature behavior model is now described with reference to the example code segment 10 of FIG. 1A. An example feature description 55 that is input to the system may describe a feature relating to the method's "Master" behavior and the method's "Slave" behavior. For example, code segment 10 of FIG. 1A includes a feature's "Master" behavior supporting a user to sell any stock holding in his/her account via the system. In this example, to implement this feature, the system needs to: first, get the stock holding the user wants to sell; second, get and remove the stock holding from the user's account; and third, update the balance of the user's account. Summarily, the master behavior feature description 55 input to the system may be described as an action and an entity (e.g., sell stocks). From the example code segment 10 of FIG. 1A, a feature's "Slave" behaviors may include a sequence of internal behaviors. For example, based on the example of FIG. 1A legacy code segment 10, such Slave behaviors specified may be actions including: "get" (to obtain the entities: e.g., user's stock holding); "remove" entities; and "update" entities such as the balance of the account.

In one embodiment, master and slave behaviors may be generated based on patterns (e.g., summary info, detail info(first, . . . ; second, . . . ; third, . . . )). These patterns could be predefined, e.g., mined from data or knowledge bases.

Thus, an example feature behavior model generated by module 80 includes a description of the feature's "Master" behavior: (action: sell; entities: stock holding) and "Slave" behaviors: (action: get; entities: stock holding; action: remove; entities: stock holding; and action: update; entities: balance, account).

In one embodiment, the method infers the hidden feature behavior model in the user input, for use in searching codes using this behavior model.

Figure 4:
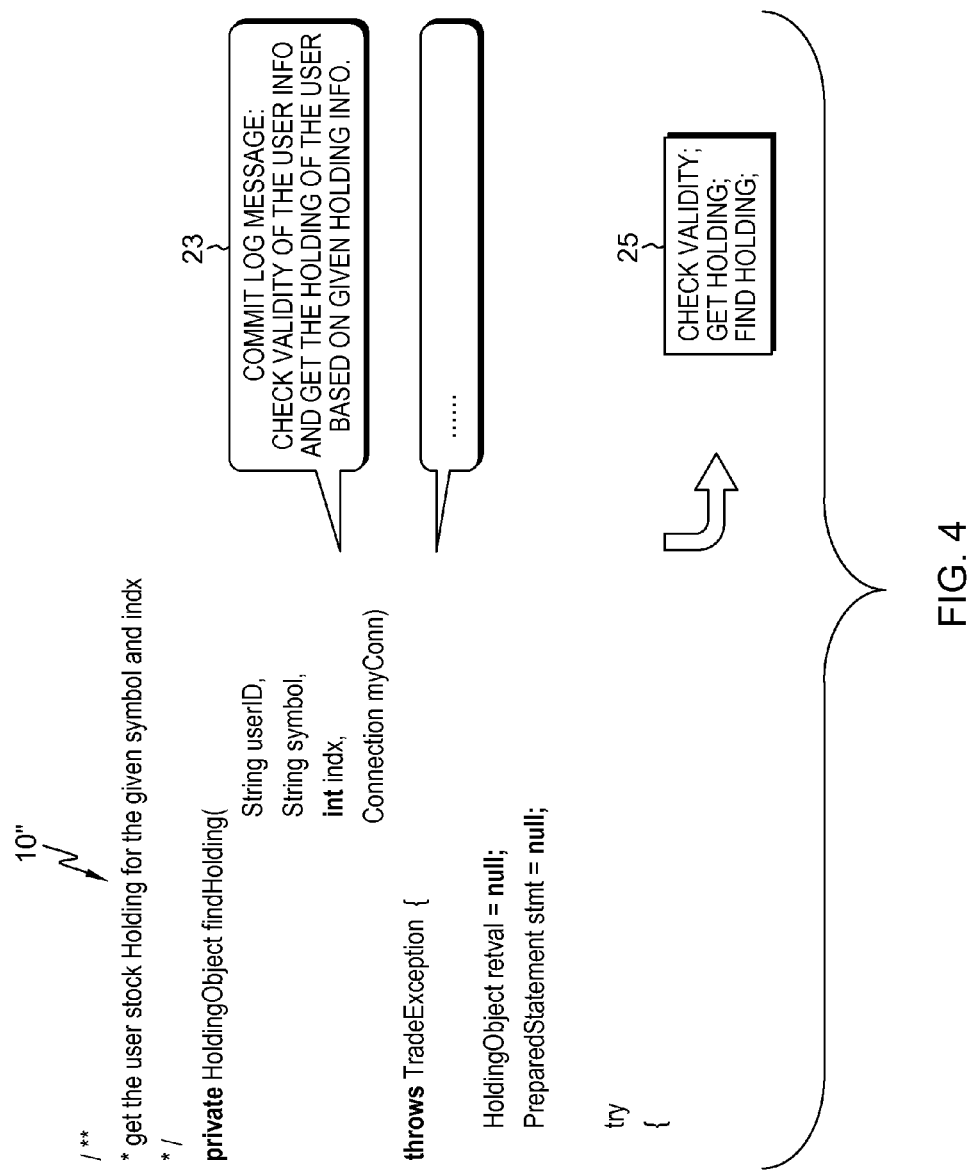
FIG. 4 shows an example processing and results obtained from the module's processing of the source code to obtain a behavior signature of an example method.

Returning to FIG. 2, there is depicted the method behavior signature analyzer 20 implementing functionality for obtaining information from multiple information sources 22 associated with each method being analyzed to generate an expressive behavior signature 25 for each method in the source code. FIG. 4 shows an example processing and results obtained from the module's processing of the source code to obtain a behavior signature of an example method. With reference to FIG. 4, for example, there is depicted a further example source code segment 10" corresponding to the functional source code segment 10' example of FIG. 1B. That is, the behavior signature analysis performed identifies a further example source code segment 10" defining a "HoldingObject" object including a "findHolding" method that is called from each of the source code segment methods 10 and 10' of respective FIGS. 1A, 1B to invoke functionality for obtaining, in the example legacy system application, the user sell Holding for a given symbol and index. In a database context, as a "commit" is an application of a single transaction, and from related artifacts information, e.g., the commit log record of transactions (not shown), the method behavior signature analyzer 20 identifies a commit log record having an example commit log message 23 from which expressive behavior signature of the "findHolding" method is determined. That is, for example, based on the "commit log msg" 23, the method applies existing NLP techniques (e.g., Apache OpenNLP) to extract verb-noun pairs (e.g., check validity, get holding). Based on code analysis (e.g., method name), verb-noun pairs (e.g., find holding) may also be extracted. Then, in response, the method behavior signature analysis module 20 generates an expressive behavior signature 25 that includes a sequence of slave behaviors, e.g., in this example, including behaviors of "checking" validity; "get" a holding, and "finding" the holding.

Returning to FIG. 2, there is depicted the feature related code scope identification method 30 implementing functionality to receive the generated expressive behavior signature 25 and the generated feature behavior model 75 associated with the feature description and implement processing to identify the source code methods 35 in the legacy source code exhibiting the feature.

Figure 5:
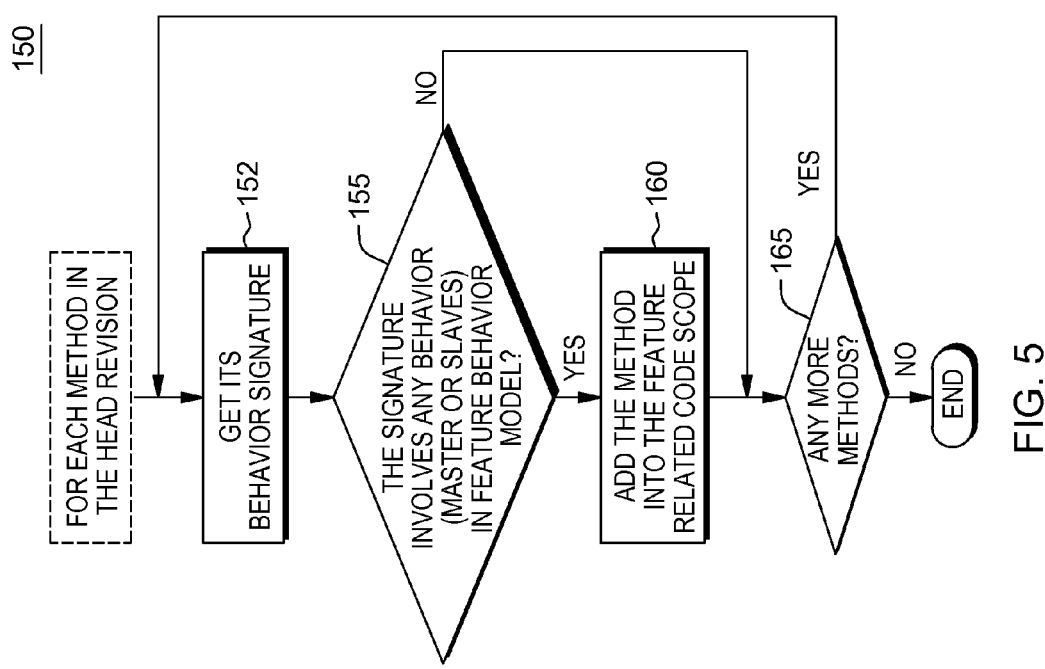
FIG. 5 shows an example feature related code scope identification processing method 150 according to one embodiment.

FIG. 5 shows an example feature related code scope identification processing method 150. This method 150 is performed for each method in the head revision of the legacy source code. As shown in method 150, a first step is to receive or access the behavior signature 25 generated from the expressive behavior signature module 20, and then at 155, making a determination as to whether the signature involves any behavior (master or slaves) in the feature behavior model 75. This involves comparing the behavior expressions obtained from module 20 against the determined "slave" behaviors or "master" behavior results indicated in the received feature behavior model 75. If it is determined at 155 that the expressive behavior signature obtained from the expressive behavior signature module 20 does not involve any feature master behavior or slave behavior, then that method is not related to the feature code scope. Thus, the method proceeds to 165 to determine if any more methods are available for the identifying feature related code. If there are more methods, then the process proceeds back to 152 to repeat the comparison step 155; otherwise, if no more methods are available, then the process ends. Returning to step 155, if is determined that the expressive behavior signature obtained from the expressive behavior signature module 20 does involve any feature master behavior or slave behavior from model 75, then that method is related to the code scope and the method is flagged as a feature related code at 160. The method is added to the list of feature related code methods 35 as shown in FIG. 2. Returning back to FIG. 5, after adding the method to the list, then the method 150 proceeds to step 165 to determine availability of any more methods to be compared in which case the method 150 is repeated for the new method, or terminates.

Thus, feature implementations are identified the based on given feature description.

Returning to FIG. 2, there is depicted the further method behavior analysis model 40 that operates on identified methods 75 having the feature related code and that implements processing for determining an identified method's behavior. In one embodiment, method behavior analysis model 40 implements control flow graph techniques for generating a behavior model for each method 37 in the feature related code scope. For example, in one embodiment, static code analysis techniques are applied (e.g., with Soot API, http://en.wikipedia.org/wiki/Soot_(software); or WALA (http://wala.sourceforge.net/wiki/index.php/Main_Page) or any like existing tool to extract a control flow graph (CFG) of each method under analyzing. Then, an attempt is made to simplify the CFG of each method, e.g., by removing all nodes except method-call nodes, i.e., all nodes in simplified CFGs will only contain method-call nodes.

Figure 6:
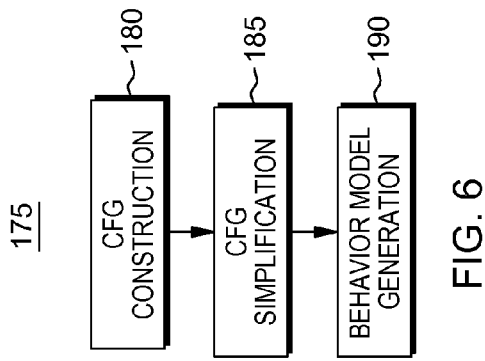
FIG. 6 shows an example CFG-based behavior model generation processing method.

FIG. 6 shows an example CFG-based behavior model generation processing method 175. In one embodiment, the CFG-based behavior model generation processing method 175 operates to determine method behavior for each method 37 in the feature related code scope. As shown, a first step 180 includes, for the current method 37 having feature related code scope, implementing existing static code analysis techniques to construct a control flow graph based on the method. In one embodiment, for example, the CFG build functionality may be found in current software products, e.g., Eclipse plug-in for the Eclipse integrated development environment. Then, at 185, the method performs simplifying the created control flow graph. The simplification at step 185 involves focusing on only method calls in the feature related code scope. Once simplified, the codes model behavior is generated at behavior model generator step 190. At 190, the determined behavior signature is used to replace each method call statement.

Figure 7A:
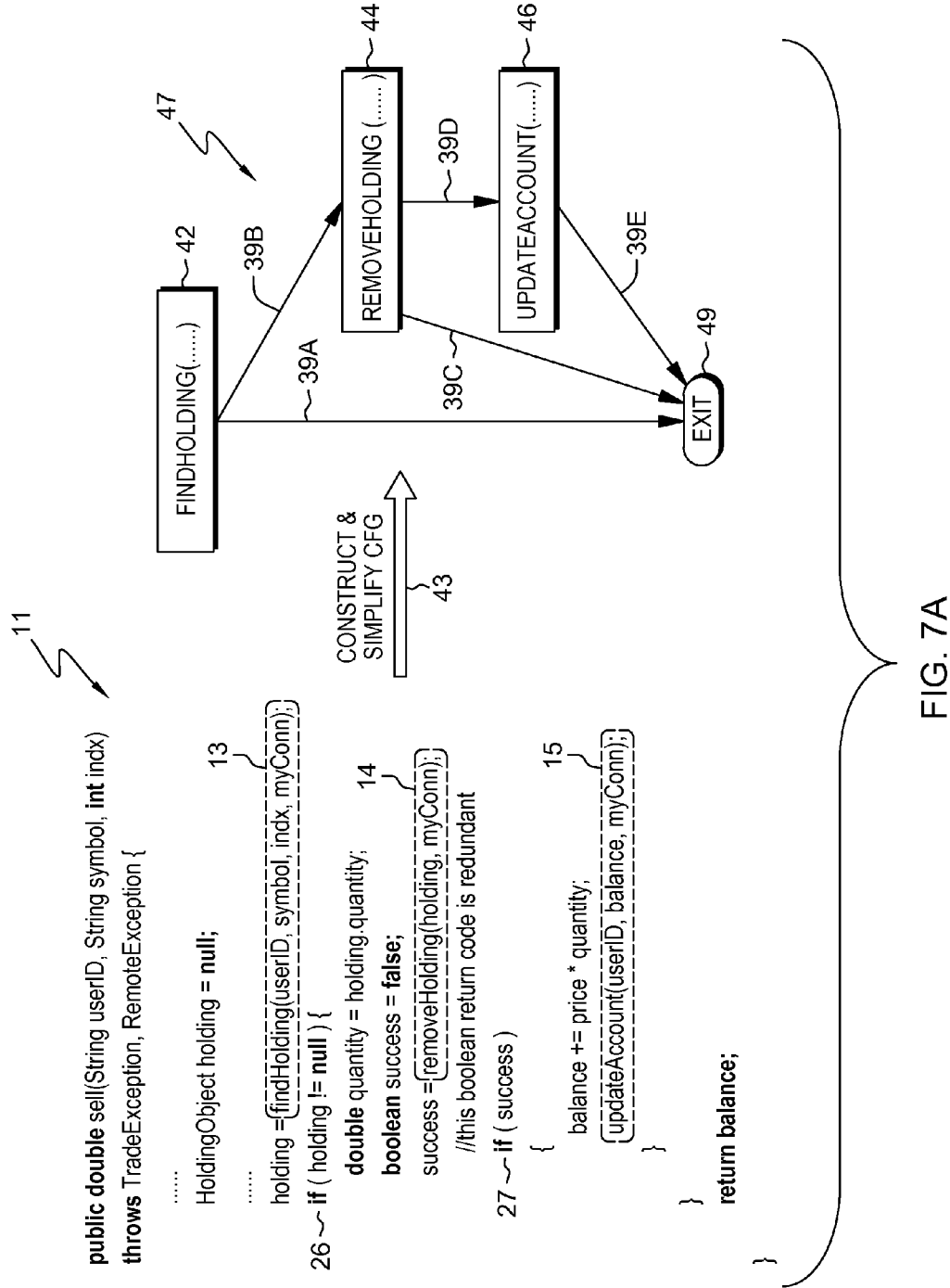
FIG. 7A shows a first example excerpt of a program object that includes an example method identified as having feature related code scope.

As an example of CFG-based behavior model generation, FIG. 7A shows a first example excerpt of a C++ program fragment that includes a method 11 named "sell( )" identified as having feature related code scope. This sell( ) function 11 is defined as passing three variables (userID string, symbol, and index integer), and is determined as invoking (e.g., calling) three methods including a call 13 to a "findHolding( )" method, a call 14 to a "removeHolding ( )" method, and an "updateAccount( )" method call 15. Operating on software of the method 11 using existing CFG-based model generation techniques 43, method behavior analysis module 40 constructs a corresponding CFG graph structure 47 such as shown in FIG. 7A. As shown, via method 11, FIG. 7A, a calling top level executed method 13 findHolding( ) maps to the representative top node 42 of the CFG graph 47. Additionally, based on a method step 26 in method 11 that evaluates a condition, the CFG 47 will model either result by showing that the method will traverse a path 39A that includes terminating at exit node 49, or traverse a path 39B that includes running a step making a further call to the removeHolding( ) method as shown in the graph 47 as corresponds to the method 14 in method 11. Likewise, as shown in FIG. 7A, based on a further method step 27 in method 11 that evaluates a further condition in the example method 11, the CFG 47 will model either result by showing that this method will traverse a path 39C and terminate at exit node 49, or traverse a further path 39D that includes running a step making a further call to the updateAccount ( ) call 46 as shown in the graph 47 as corresponds to the method 16 in method 11. Finally, in the constructed model behavior graph 47, from the modeled method step node 46 there is traversed a path 39E that includes terminating at exit node 49.

Figure 7B:
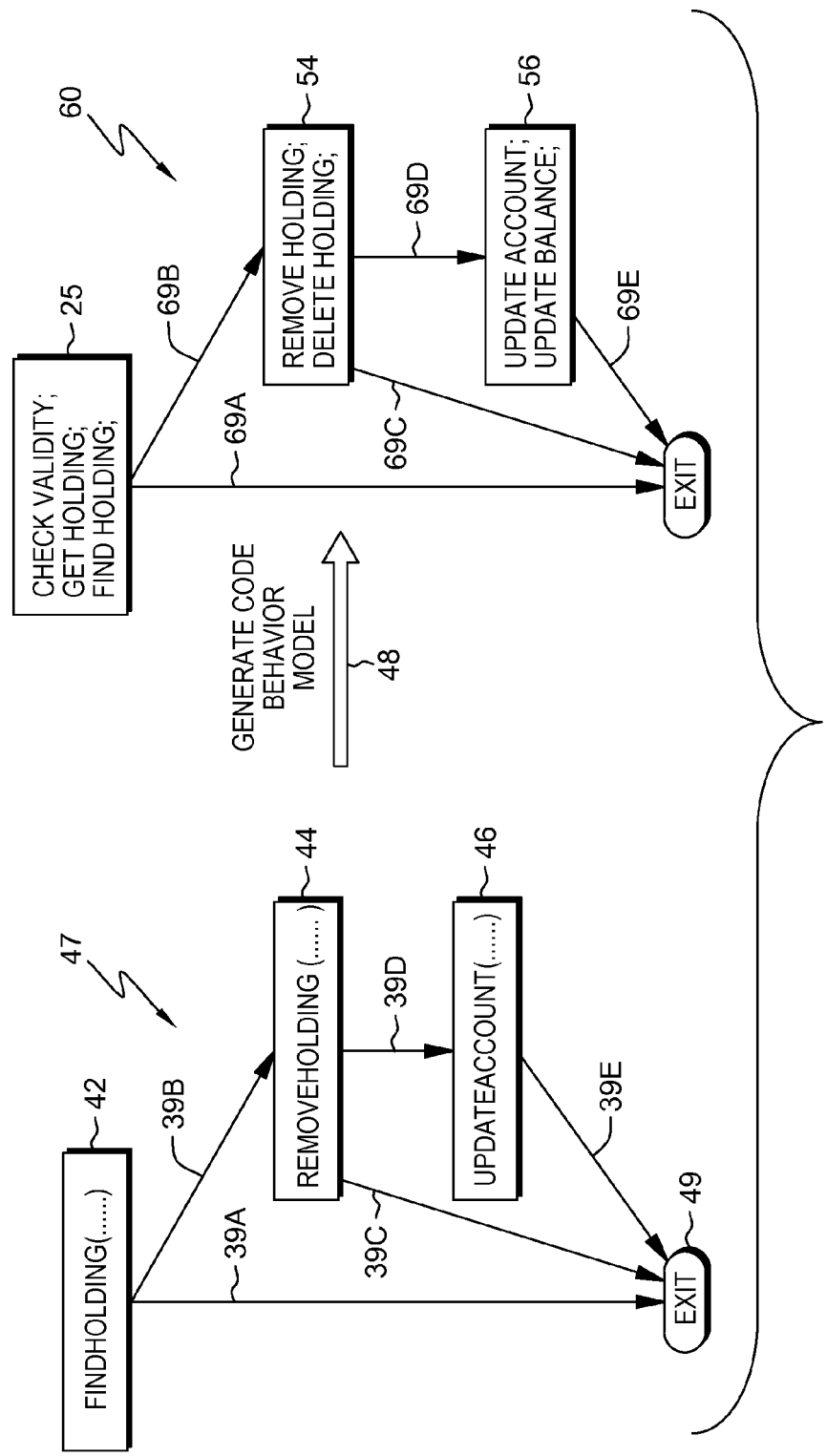
FIG. 7B shows an example generated code behavior model based on the constructed CFG for the method of FIG. 7A.

FIG. 7B shows an example generated code behavior model 60 based on the constructed CFG 47 for method 11 of FIG. 7A. In one embodiment, at 48, based on an identified method name, a comment associated with the message, a commit log message associated with the method, or an associated work item described for each method call, the resulting code behavior model 60 is generated. Thus, in the example generated code behavior model 60, as depicted in FIG. 7B, the method call "findHolding( )" is assigned its feature-related expressive behavior signature 25 obtained as a result of method behavior signature analysis block 20 as shown in FIG. 4. That is, in the example generated code behavior model 60, the method call "findHolding( )" 42 is assigned the method's previously determined feature behaviors 25 of "check" validity; "get" a holding, and "find" the holding. Likewise, in the example generated code behavior model 60, the method call "removeHolding( )" 44 is assigned the method's prior determined example feature behaviors of remove holding, and delete holding 54. Likewise, in the example generated code behavior model 60 of FIG. 7B, the method call "updateAccount( )" 46 is assigned the method's prior determined example feature behaviors of update account and update balance 56. As shown in FIG. 7B, respective path behaviors 39A-39E interconnecting nodes 42, 44, 46, 49 in the constructed CFG graph 47 for the example method, are reflected in the corresponding respective paths 69A-69E of the generated code behavior model 60.

Returning to FIG. 2, there is depicted the feature location identification and ranking method 90 implementing functionality to receive the generated code behavior model 60 and feature behavior model 75 associated with the feature description, and implement processing to identify and rank the identified feature locations 95.

Figure 8:
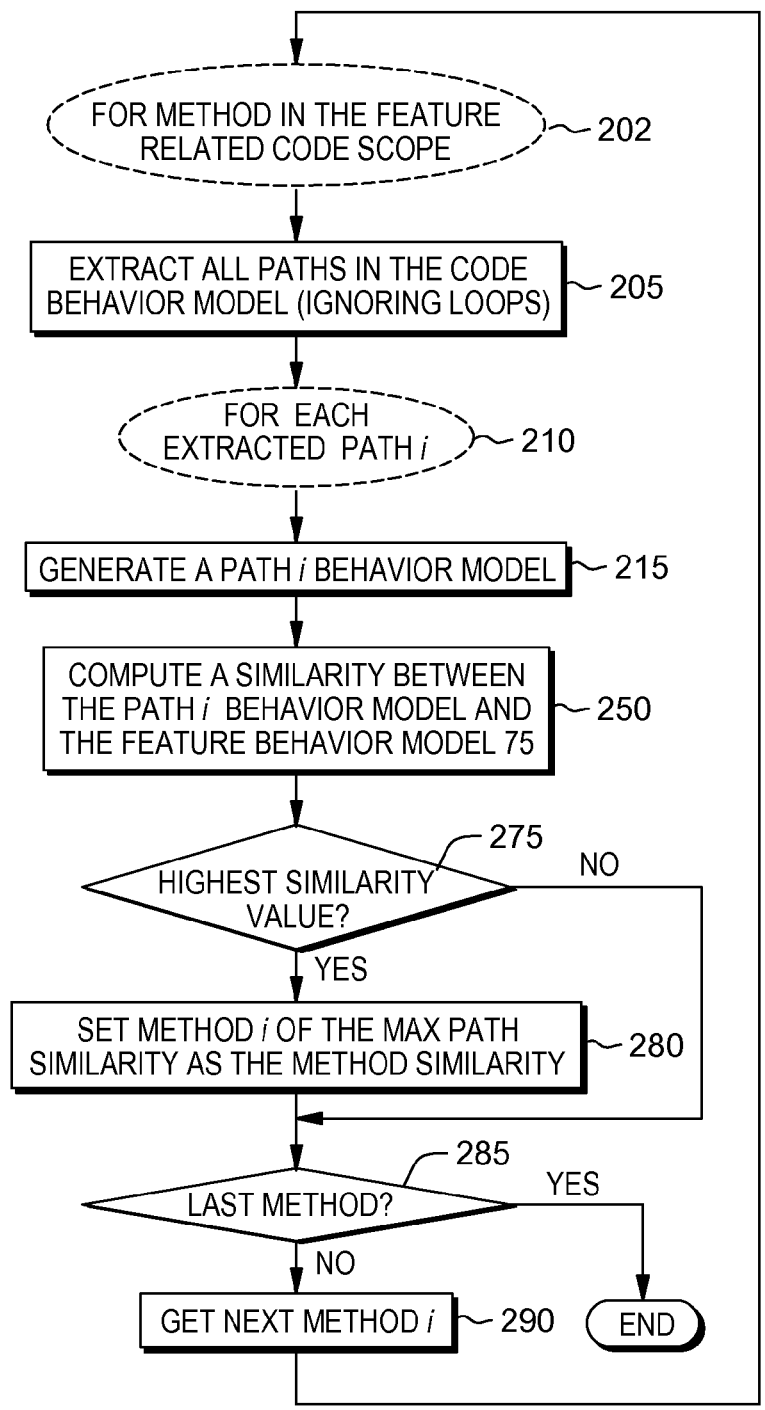
FIG. 8 depicts a methodology 200 for Behavior-Model-Based Feature locating identification, and ranking according to one embodiment.

FIG. 8 depicts a methodology 200 for Behavior-Model-Based Feature locating identification, and ranking Here, inputs include the feature behavior model and the code behavior model and the module 90 generates an output of ranked feature locations and ranked feature-related methods. The method steps 200 shown in the figures are applicable to each method identified having the feature related scope.

At a first step 202, there is depicted, obtaining a method in the feature related code scope, and then, at 205, extracting all paths in the code behavior model. For example the paths 69A-69B, i.e., the behavior signatures, of the method call statements would be extracted. In one embodiment, any code loops may be ignored. Then, for each path i extracted at 210, the method includes generating a path i behavior model at 215. A path i behavior model is for a path i. The generation of a path behavior model at 215 comprises performing a sequencing of the behavior signatures of the method-call statements in the path, e.g., based on their appearance orders in the path. For example, in FIG. 7A, a path i behavior model would comprise findHolding( )→removeHolding( )→updateAccount( ).

The method continues to step 250 to compute a similarity between the path behavior model for method i and the feature behavior model 75.

Figure 9:
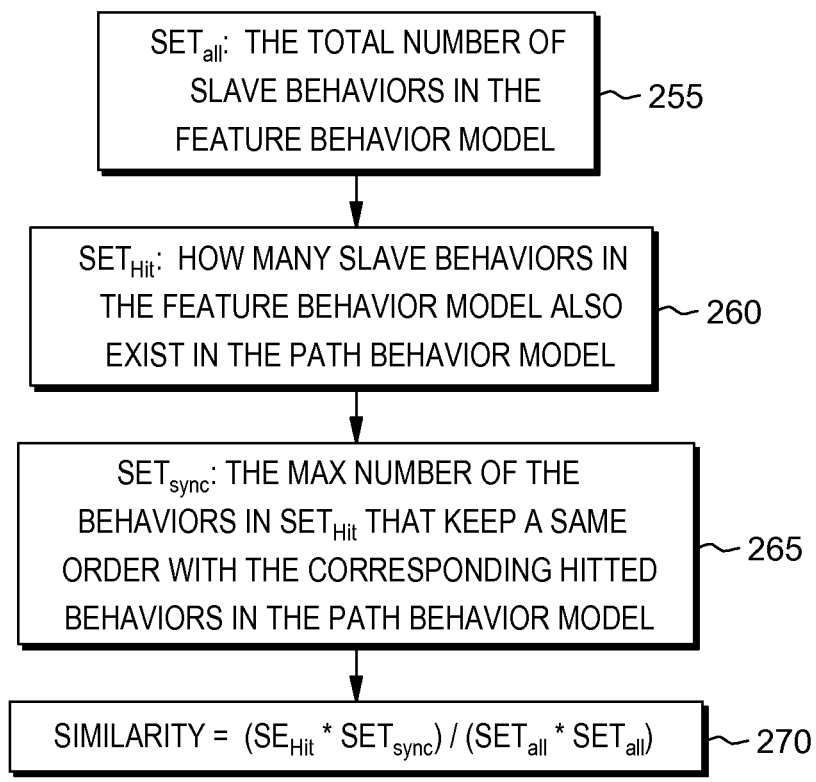
FIG. 9 shows, in one embodiment, detailed steps for computing a similarity between the path behavior model for method i and the feature behavior model corresponding to process step of FIG. 8.
Figure 10:
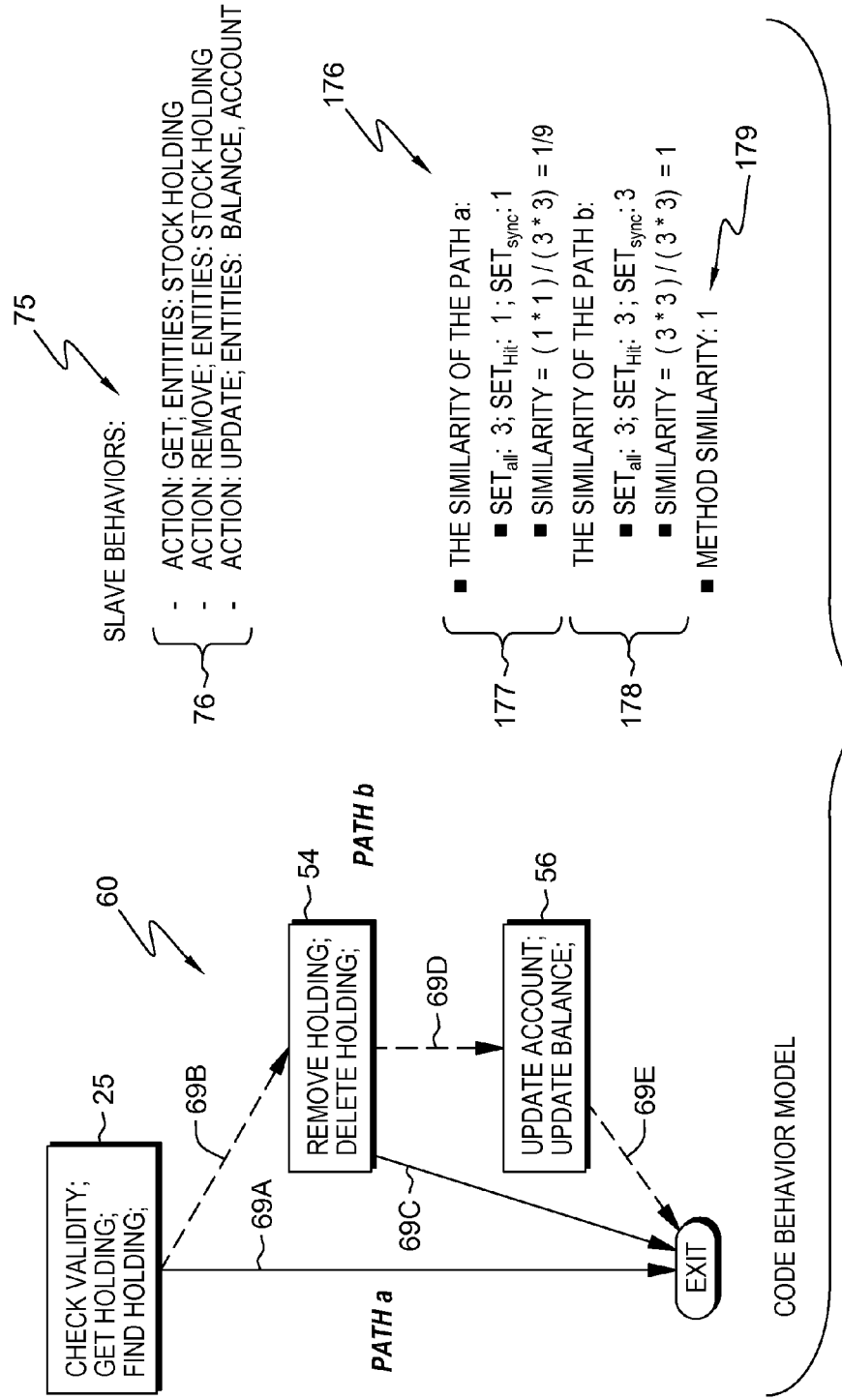
FIG. 10 shows an example of generated path behavior model including a sequencing of the behavior signatures of the method-call statements in the path, e.g., based on their appearance orders in the path, according to one embodiment.

FIG. 9 shows, in one embodiment, detailed steps for computing a similarity between the path behavior model for the identified method and the feature behavior model corresponding to process step 250 of FIG. 8. Method 250 includes, at 255, determining the total number of slave behavior in the feature behavior model 75 and setting this value as $Set_{all}$. There is additionally performed at 260 determining how many slave behaviors in the feature behavior model 75 also exist in the path i behavior model and setting this value to $Set_{Hit}$. There is additionally performed at 265 determining a maximum number of the behaviors in $Set_{Hit}$ that keep a same order with the corresponding "hitted" behaviors. in the path behavior model and setting this value to $Set_{sync}$. With reference to FIG. 10, an example of a "hitted" behavior is "<get, stock holding>", where "get" is the hitted action, and "stock holding" is the hitted entity. Then, at 270, FIG. 9, there is performed a method step for computing a similarity score representing the similarity between the path behavior model and the feature behavior model 75. In one embodiment, this computing of a Similarity measure step is a calculation of:

$$Similarity=(Set_{Hit}*Set_{sync})/(Set_{all}*Set_{all}).$$

Then, returning from step 250 processing, the method proceeds back to step 275, FIG. 8, where a ranking determination is made. Ranking determining involves process to compare a currently computed similarity value computed form the current path i against all other similarity values in order to determine a maximum value of all the similarity values computed for all the other extracted paths i of that method. The highest ranked similarity value among all the identified paths i determined for that feature code scope method 37 is treated as the Similarity method.

At this point, processing may include determining which method Similarity value is the greatest of all the method Similarity values computed for all the methods 37 tested from the identified feature related code scope methods 35. The method 37 of the identified feature related code scope methods 35 having the highest similarity value is deemed most related to with the given feature request.

If, at 275, it is determined that the computed Similarity measure for a path i of a current method is the greater than the other computed so far, then at 280 the current method i is set as the Similarity method for the initial feature description, and the method proceeds to step 285. The Similarity method is the method most related to the user specified features. Otherwise, at 275, if it is determined that the computed similarity value for the current method is not greater than the other values for the other methods computed so far, then the process 200 proceeds directly to step 285.

At step 285, a further determination is made as to whether the current feature related code scope method having path behaviors paths i models for which a method Similarity value has just been compared is the last method of the identified feature related code scope methods 35 having code scope behaviors. If, at 285, it is determined that there are other remaining identified feature code scope methods 35 having code scope behaviors, then the process proceeds to step 290 to get the new method, and return to step 202 to repeat process steps 202-285 for the retrieved new method. Otherwise, if the last identified feature code scope method 35 has been processed at 285, the method implemented for feature location identification and ranking terminates. As a result, the method having the highest Similarity measure, i.e., a feature related code scope method having most matched features is the Similarity method. That is, of the identified methods 35 of feature related code scope, the system will recommend a method having a maximum similarity value for a path behavior model generated and the greatest Similarity measure value.

In one embodiment, the recommended code unit(s) related with the given feature description may be implemented for purposes of generating new application programming interfaces (API) to legacy data storage systems such as implemented for human resources applications, customer resource management (CRM) applications, enterprise resource planning applications, legacy databases, etc. That is, API enablement services may benefit from the system and methods herein to facilitate the creation of APIs to integrate existing-system data and function with new systems of engagement. For example, such API's generated using techniques for feature location described herein, may be closely bound to mobile devices, e.g., via HTTP Notification Data sync, or other systems-of-engagement to provide seamless client experience.

FIG. 10 shows an example application of the determining of a Similarity measure for the determined behavior model for paths i corresponding to the generated code behavior model 60 based on the constructed CFG 47 for method 11 of FIG. 7A. As shown, FIG. 10 shows for the example path behavior models-a first behavior model corresponding to an first extracted path a comprising a path 69A a and a second behavior model corresponding to a second extracted path b comprising paths 69B, 69D and 69E shown as broken lines. As shown, an example generated feature model 75 includes example software method Slave behaviors 76 including: a "get"; entities action: e.g., get a stock holding; a: "remove" entities action, e.g., remove stock holding; and an "update" entities action, e.g., update a account balance. FIG. 10 further shows the corresponding calculations for Similarity values 176 based on the path a and path b behavior models. For example path a: computing results 177 show value for $Set_{all}$ is 3; value for $Set_{Hit}$ is 1; and the $Set_{sync}$ value is 1. This results in Similarity measure=(1*1)/(3*3)=1/9 for path a. For example path b: computing results 178 show value for $Set_{all}$ is 3; value for $Set_{Hit}$ is 3; and the $Set_{sync}$ value is 3. This results in Similarity measure=(3*3)/(3*3)=1 for path b. The highest ranked similarity value among the extracted path a and path a determined for that feature code scope method is treated as the Similarity method. In this example, the method assigns the path b value of 1 to the Similarity measure for that method as indicated at 179.

Figure 11:
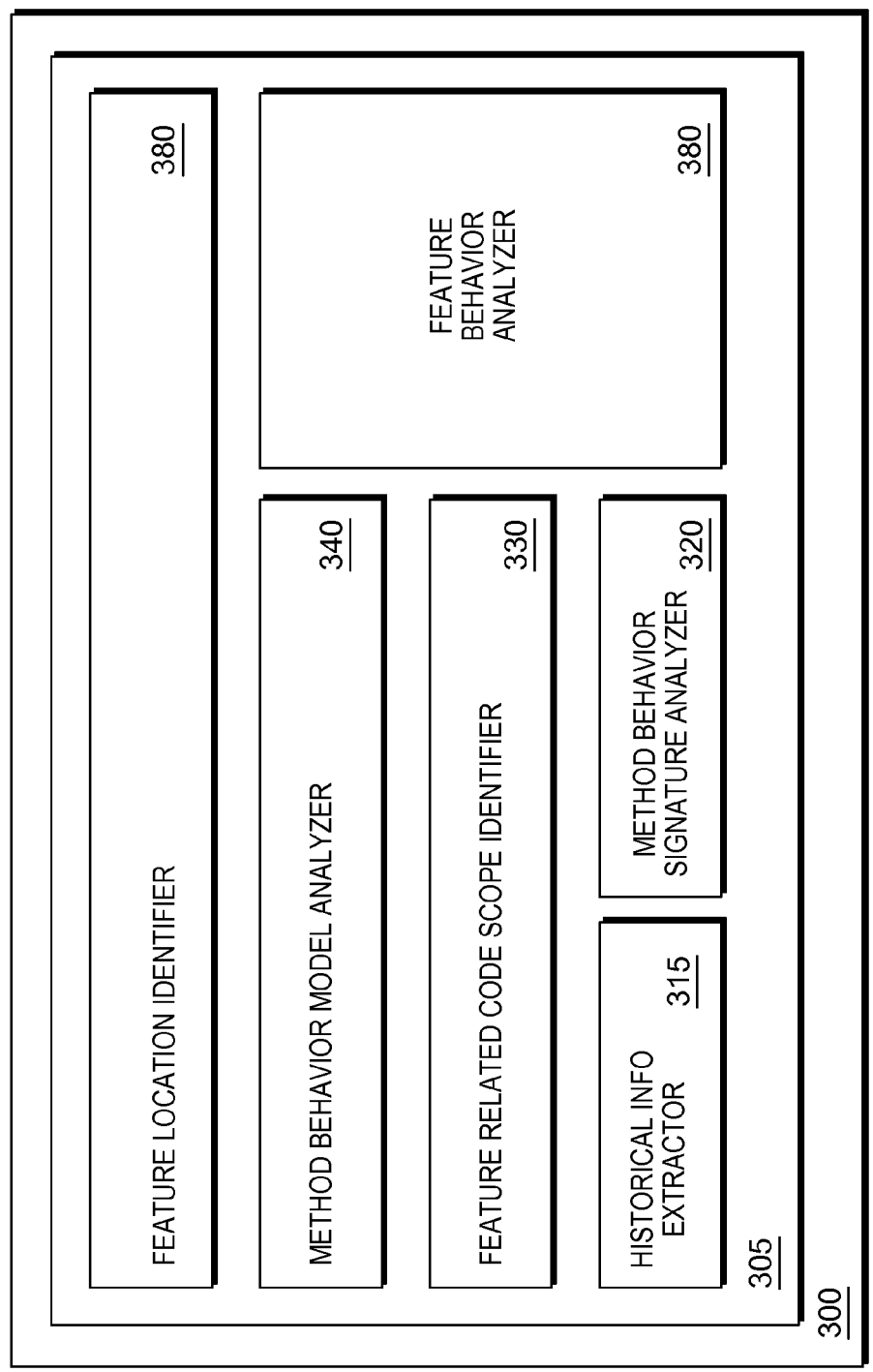
FIG. 11 shows a block diagram of the major system components of a computing system for effective feature location in large legacy systems.

FIG. 11 shows a diagram 300 of the major system components of a computing system 300 for effective feature location in large legacy systems. Each component includes programmed instructions that execute on the software legacy system code and in one embodiment, such a computer system includes a receiving element configured to receive portions of any software code deemed "legacy" from a memory storage device that the various components operate upon as described herein. Instructions of the various modules are stored at various locations in memory storage 305. Included is the feature behavior model analyzer component 380 running programmed instructions governing the system to extract the internal behaviors feature under a querying based on NLP techniques or rules written that specify the feature and generating a feature behavior model describing the code feature to be located is generated. In one embodiment, the feature specified may be received as part of a user query entered via an electronic interface, e.g., command line or graphic display (not shown). System 300 further implements the method behavior signature analyzer 320 running programmed instructions governing the system to obtain information from multiple information sources associated with each method being analyzed and to generate an expressive behavior signature 25 for each method in the source code. Assisting in extracting the related artifacts information is a historical information extractor component 315. System 300 further implements a feature related code scope identification component 330 running programmed instructions governing the system to receive the generated expressive behavior signature 25 and the generated feature behavior model 75 associated with the feature description and implement processing to identify the source code methods 35 exhibiting the feature. The feature related code scope identification component 330 implements the control flow information techniques for the subject methods 35 being analyzed A further method behavior model analysis component 340 for determining the method's behavior from methods 37 that are identified by processing module 30 as including the feature related code. In one embodiment, the method behavior model analyzer 340 integrates control flow graph (CFG) information generated for each method, and the signature information of its callees to generate an extended CFG-based code behavior model 60 for each method 35. The feature location identifier and ranking module 380 runs programmed instructions governing the system to receive the generated feature behavior model 75 and the generated code behavior model 60 and identify and rank the initial code locations 95 related to the feature under querying based on the similarity between the feature behavior model and the method behavior models. It is understood that in the embodiments described herein, code locations are known information associated with each method.

Although not shown, each of these programmed instructions may operate on by different computing elements or distributed machines, each operatively connected together via a system bus (not shown). In one example, communication between and among the various system components may be bi-directional. In another example, communication amongst the elements may be carried out via network (e.g., the Internet, an intranet, a local area network, a wide area network and/or any other desired communication channel(s)). In another example, some or all of these elements may be implemented in a computer system of the type shown in FIG. 12.

Thus, the methods of the described herein can be used to expedite creation and development of APIs for enterprise legacy systems. These API's may be developed for Platform Selection & Targeted Expansion, "Re-platforming" of Core Legacy Systems, or as a Business-as-a-Service/Built-on-the-Web Enterprise solution.

Figure 12:
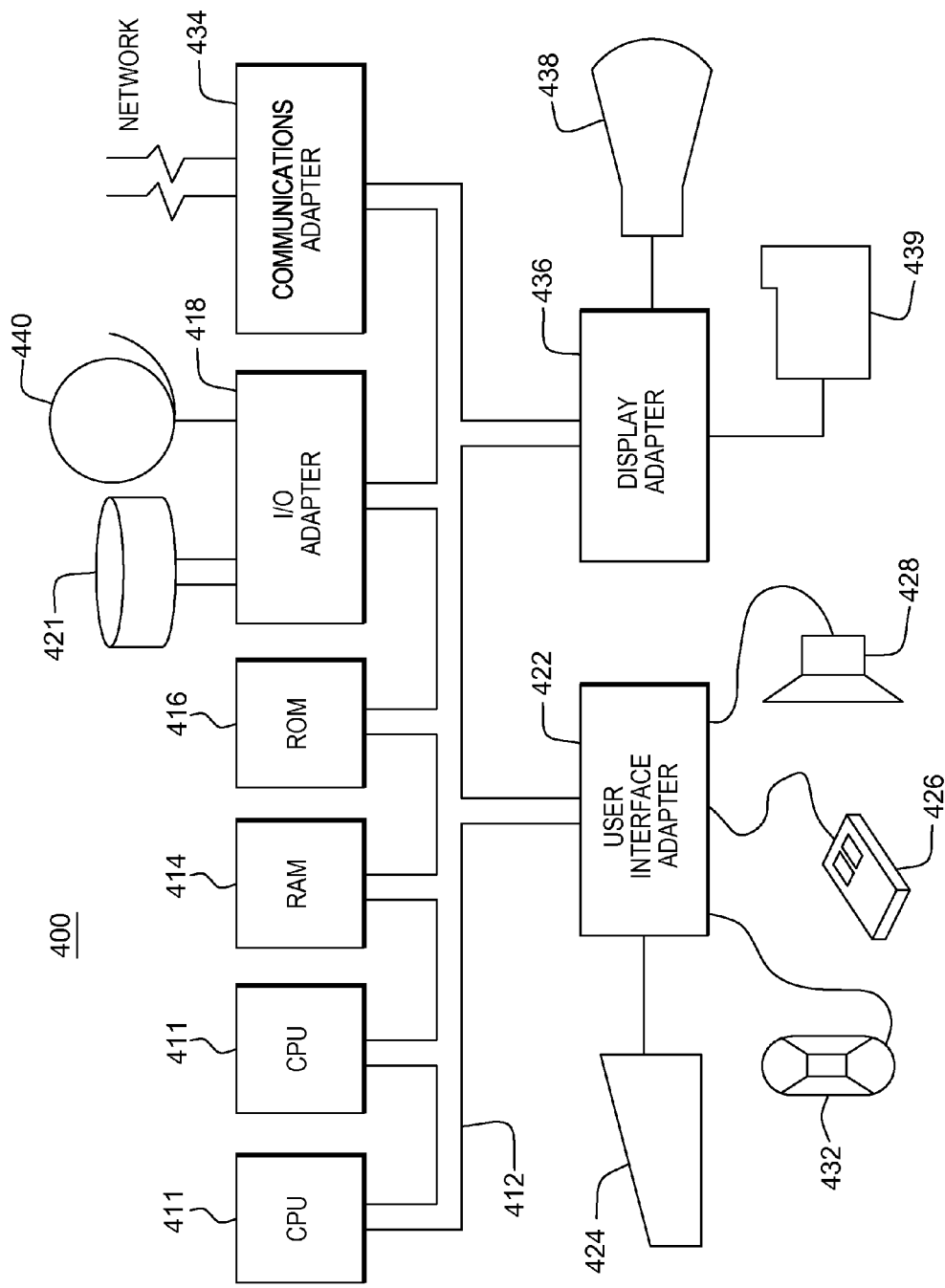
FIG. 12 depicts an exemplary hardware configuration for performing methods as described herein.

FIG. 12 illustrates one embodiment of an exemplary hardware configuration of a computing system 400 programmed to perform the method steps for implementing determining a trans-vendor paint recommendation service as described herein with respect to FIGS. 4A-4B and 5. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the disclosure has been described in terms of specific embodiments, it is evident in view of the foregoing description that numerous alternatives, modifications and variations will be apparent to those skilled in the art. Various embodiments of the present disclosure can be employed either alone or in combination with any other embodiment, unless expressly stated otherwise or otherwise clearly incompatible among one another. Accordingly, the disclosure is intended to encompass all such alternatives, modifications and variations which fall within the scope and spirit of the disclosure and the following claims.

What is claimed is:

1. A computer-implemented method for effective feature location in software code comprising:
    receiving a specification of a software feature implementation to be located in software code,
    generating a feature behavior model specifying one or more of: an action and/or entity "master" behavior and a action and/or entity "slave" behavior;
    accessing methods and related artifacts from a source code repository;
    generating an expressive behavior signature for an accessed method based on any related artifacts information;
    identifying one or more feature-related code scope methods exhibiting the feature implementation using the expressive behavior signature for the method and the generated feature behavior model associated with the feature description;
    generating a code behavior model for each one or more feature-related code scope method;
    determining a similarity between the feature behavior model and the code behavior models; and
    identifying and ranking a feature location feature-related code locations based on the similarity determining,
    wherein a hardware processor device performs one or more said receiving, said feature behavior model generating, said accessing, said analyzing, said expressive behavior signature generating, said feature-related code scope identifying, said code behavior model generating determining, and said feature-related code locations identifying and ranking.

2. The method of claim 1, wherein said generating a code behavior model comprises:
    initiating a static code analysis upon a current subject feature-related code scope method to generate a control flow graph (CFG) information for that method; and
    integrating said CFG information generated for each method and a signature information of a method's callees in said code behavior model, said generated control flow information resulting in an increased fine-grained code behavior model.

3. The method of claim 2, wherein said generating a feature behavior model comprises
    extracting an internal behavior of the specified feature based on one of: Natural Language Processing techniques or writing rules of the feature specification.

4. The method of claim 3, wherein said specified is received from a user as part of a user query.

5. The method of claim 3, wherein said generating an expressive behavior signature for the method comprises:
obtaining information about the software code method from multiple information sources associated with each method being analyzed; and
using static code analysis for analyzing the behavior model of methods in software source code of the accessed method and obtained information to generate an expressive behavior signature.

6. The method of claim 1, wherein said determining a similarity between the feature behavior model and the code behavior models comprises:
obtaining a feature-related code scope method,
receiving said feature behavior model and the code behavior model associated with the obtained feature-related code scope method;
extracting all paths in the code behavior model; and for each path i extracted:
generating a path i behavior model by a sequencing of the behavior signatures of the method-call statements in the extracted path.

7. The method of claim 6, wherein said generating a path i behavior model performing a sequencing of the behavior signatures of the method-call statements in the path is based on their appearance orders in the path.

8. The method of claim 6, wherein said determining a similarity between the path behavior model for the obtained feature-related code scope method and the feature behavior model comprises:
determining, by said hardware processor, the total number of slave behavior in the feature behavior model and setting this value as $Set_{all}$;
determining, by said hardware processor, how many slave behaviors in the feature behavior model also exist in the path i behavior model and setting this value to $Set_{Hit}$;
determining, by said hardware processor, a maximum number of the behaviors in $Set_{Hit}$ that keep a same order with the corresponding "hitted" behaviors in the path behavior model and setting this value to $Set_{sync}$; and
computing, by said hardware processor, a Similarity score representing the similarity between the path behavior model and the feature behavior model according to:

$$Similarity=(Set_{Hit}*Set_{sync})/(Set_{all}*Set_{all}).$$

9. The method of claim 1, wherein said identifying one or more feature-related code scope methods comprises:
receiving for each method in a top revision of the legacy source code
obtain the expressive behavior signature of an accessed method;
comparing the behavior expressions obtained against a determined "slave" behavior or "master" behavior indicated in the received feature behavior model;
determining whether the signature involves any master behavior or slave behavior in the feature behavior model; and if is determined that the expressive behavior signature obtained does involve any feature master behavior or slave behavior from model,
flagging that accessed method as a feature-related code scope method; and
adding the flagged as a feature-related code scope method to a list of feature related code methods.

10. A system for effective feature location in software code comprising:
a memory storage device storing a program of instructions;
a hardware processor device receiving said program of instructions to configure said processor device to:
receive a specification of a software feature implementation to be located in software code,
generate a feature behavior model specifying one or more of: an action and/or entity "master" behavior and a action and/or entity "slave" behavior;
access methods and related artifacts from a source code repository;
generate an expressive behavior signature for an accessed method based on any related artifacts information;
identify one or more feature-related code scope methods exhibiting the feature implementation using the expressive behavior signature for the method and the generated feature behavior model associated with the feature description;
generate a code behavior model for each one or more feature-related code scope method;
determine a similarity between the feature behavior model and the code behavior models; and
identify and rank a feature location feature-related code locations based on the similarity determining.

11. The system of claim 10, wherein to generate a code behavior model, said processor device is further configured to:
initiating a static code analysis upon a current subject feature-related code scope method to generate a control flow graph (CFG) information for that method; and
integrate said CFG information generated for each method and a signature information of a method's callees in said code behavior model, said generated control flow information resulting in an increased fine-grained code behavior model.

12. The system of claim 11, wherein to generate said feature behavior model, said processor device is further configured to:
extract an internal behavior of the specified feature based on one of: Natural Language Processing techniques or writing rules of the feature specification.

13. The system of claim 12, wherein said specified is received from a user as part of a user query entered via an interface.

14. The system of claim 12, wherein to generate an expressive behavior signature for the accessed method, said processor device is further configured to:
obtain information about the software code method from multiple information sources associated with each method being analyzed; and
use static code analysis for analyzing the behavior model of methods in software source code of the accessed method and obtained information to generate an expressive behavior signature.

15. The system of claim 14, wherein said information sources comprise one or more of: a source code repository for source code information, which includes source code with code comments, a historical development or revision information with commit log messages, and an issue descriptions from an issue tracking database.

16. The system of claim 10, wherein to determine a similarity between the feature behavior model and the code behavior models, said processor device is further configured to:

obtain a feature-related code scope method,
receive said feature behavior model and the code behavior model generated for the obtained feature-related code scope method;
extract all paths in the code behavior model; and for each path i extracted:
   generate a path i behavior model by a sequencing of the behavior signatures of the method-call statements in the extracted path.

17. The system of claim 16, wherein to generate a path i behavior model, said processor device is further configured to: perform a sequencing of the behavior signatures of the method-call statements in the path is based on their appearance orders in the path.

18. The system of claim 16, wherein to determine a similarity between the path behavior model for the obtained feature-related code scope method and the feature behavior model, said hardware processor device is further configured to:
   determine the total number of slave behavior in the feature behavior model and setting this value as $Set_{all}$;
   determine how many slave behaviors in the feature behavior model also exist in the path i behavior model and setting this value to $Set_{Hit}$;
   determine a maximum number of the behaviors in $Set_{Hit}$ that keep a same order with the corresponding "hitted" behaviors in the path behavior model and setting this value to $Set_{sync}$; and
   compute a Similarity score representing the similarity between the path behavior model and the feature behavior model according to:

$$Similarity = (Set_{Hit} * Set_{sync}) / (Set_{all} * Set_{all}).$$

19. The system of claim 10, wherein to identify one or more feature-related code scope methods, said processor device is further configured to:
   receive for each method in a top revision of the legacy source code
   obtain the expressive behavior signature of an accessed method;
   compare the behavior expressions obtained against a determined "slave" behavior or "master" behavior indicated in the received feature behavior model;
   determine whether the signature involves any master behavior or slave behavior in the feature behavior model; and if is determined that the expressive behavior signature obtained does involve any feature master behavior or slave behavior from model,
      flag that accessed method as a feature-related code scope method; and
      add the flagged as a feature-related code scope method to a list of feature related code methods.

20. A computer program product for effective feature location in software code, the computer program product comprising a non-transitory computer readable storage media readable by a machine and storing instructions run by the machine to perform a method, said method comprising
   receiving a specification of a software feature implementation to be located in software code,
   generating a feature behavior model specifying one or more of: an action and/or entity "master" behavior and a action and/or entity "slave" behavior;
   accessing methods and related artifacts from a source code repository;
   generating an expressive behavior signature for an accessed method based on any related artifacts information;
   identifying one or more feature-related code scope methods exhibiting the feature implementation using the expressive behavior signature for the method and the generated feature behavior model associated with the feature description;
   generating a code behavior model for each one or more feature-related code scope method;
   determining a similarity between the feature behavior model and the code behavior models; and
   identifying and ranking a feature location feature-related code locations based on the similarity determining.

* * * * *